US009796004B2

(12) United States Patent
Previero

(10) Patent No.: US 9,796,004 B2
(45) Date of Patent: Oct. 24, 2017

(54) APPARATUS AND METHOD FOR THE DRY REMOVAL OF LABELS FROM CONTAINERS MADE OF PLASTICS

(71) Applicant: PREVIERO N. S.R.L., Anzano del Parco (IT)

(72) Inventor: Flavio Previero, Anzano del Parco (IT)

(73) Assignee: PREVIERO N. S.R.L., Anzano del Parco (Como) (IT)

( * ) Notice: Subject to any disclaimer, the term of this patent is extended or adjusted under 35 U.S.C. 154(b) by 76 days.

(21) Appl. No.: 14/784,856

(22) PCT Filed: Apr. 15, 2014

(86) PCT No.: PCT/IB2014/060731
§ 371 (c)(1),
(2) Date: Oct. 15, 2015

(87) PCT Pub. No.: WO2014/170824
PCT Pub. Date: Oct. 23, 2014

(65) Prior Publication Data

US 2016/0059281 A1 Mar. 3, 2016

(30) Foreign Application Priority Data

Apr. 15, 2013 (IT) .............................. MI2013A0615
May 23, 2013 (IT) .............................. MI2013A0842

(51) Int. Cl.
*B08B 9/08* (2006.01)
*B08B 9/38* (2006.01)
*B32B 38/10* (2006.01)

(52) U.S. Cl.
CPC ................ *B08B 9/083* (2013.01); *B08B 9/38* (2013.01); *Y10S 156/921* (2013.01);
(Continued)

(58) Field of Classification Search
CPC ..... B08B 9/083; B08B 9/38; Y10T 156/1179; Y10T 156/1184; Y10T 156/1983; Y10S 156/921; Y10S 156/936; B29B 17/02
See application file for complete search history.

(56) References Cited

U.S. PATENT DOCUMENTS 4,209,344 A 6/1980 Simon et al.
4,379,525 A 4/1983 Nowicki et al.
(Continued)

FOREIGN PATENT DOCUMENTS

DE 10308500 A1 9/2004
EP 2050516 A1 4/2009
(Continued)

OTHER PUBLICATIONS

International Search Report and Written Opinion of the International Searching Authority Application No. PCT/IB2014/060731 Completed: Aug. 1, 2014; Mailing Date: Aug. 7, 2014 12 pages.

*Primary Examiner* — Mark A Osele
(74) *Attorney, Agent, or Firm* — Whitmyer IP Group LLC

(57) ABSTRACT

An apparatus and method for removing labels from containers made of plastics, such as PET bottles includes: a tubular stator and a rotor defining an annular chamber that extends along a path; on the rotor members are mounted for rotationally dragging and pushing the containers inside the annular chamber; on the tubular stator there are first scraping tools provided with first tip ends; the dragging and thrusting members include second scraping tools provided with second tip ends that are distributed along one or more helical paths; the first tip ends and the second tip ends define respectively in the annular chamber a first punctiform scraping surface and a second punctiform scraping surface for the containers, in which the distance between the first punctiform scraping surface and the second punctiform scraping
(Continued)

surface is maintained substantially constant in a longitudinal and circumferal direction with respect to the rotor.

17 Claims, 10 Drawing Sheets

(52) U.S. Cl.
CPC ...... *Y10S 156/936* (2013.01); *Y10T 156/1179* (2015.01); *Y10T 156/1184* (2015.01); *Y10T 156/1967* (2015.01); *Y10T 156/1983* (2015.01)

(56) References Cited

U.S. PATENT DOCUMENTS

| | | | | |
|---|---|---|---|---|
| 9,089,878 | B2 | 7/2015 | Herbold | |
| 2011/0271982 | A1* | 11/2011 | Herbold | B08B 7/02 134/6 |

FOREIGN PATENT DOCUMENTS

| | | | | | |
|---|---|---|---|---|---|
| JP | 4488537 | B1 | | 6/2010 | |
| JP | 2010260197 | A | * | 11/2010 | B29B 17/02 |
| JP | 2014226821 | A | * | 12/2014 | |
| WO | 9208591 | A1 | | 5/1992 | |
| WO | 2009033587 | A1 | | 3/2009 | |
| WO | 2011012113 | A1 | | 2/2011 | |
| WO | 2011124597 | A1 | | 10/2011 | |

* cited by examiner

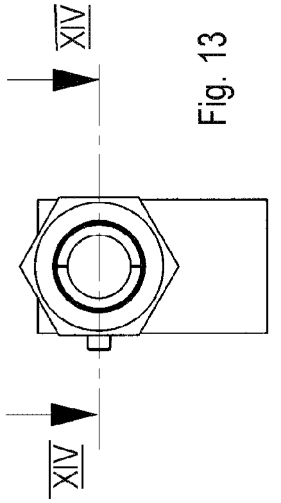
Fig. 13
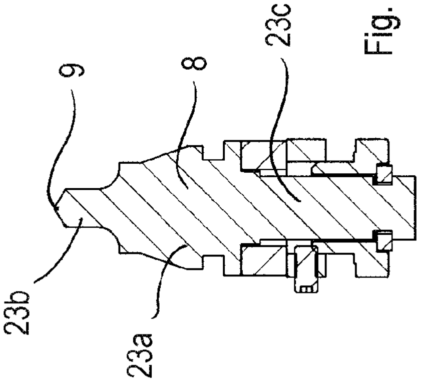
Fig. 14
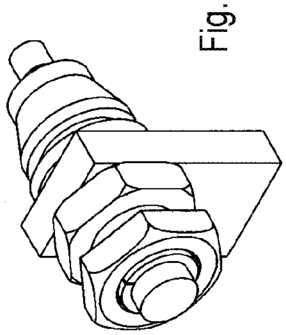
Fig.11
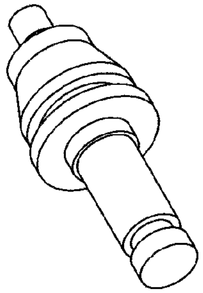
Fig. 12
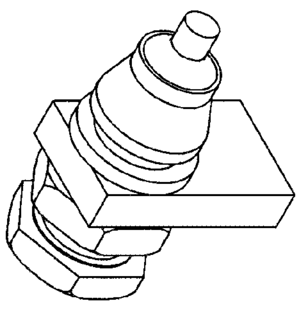
Fig.10
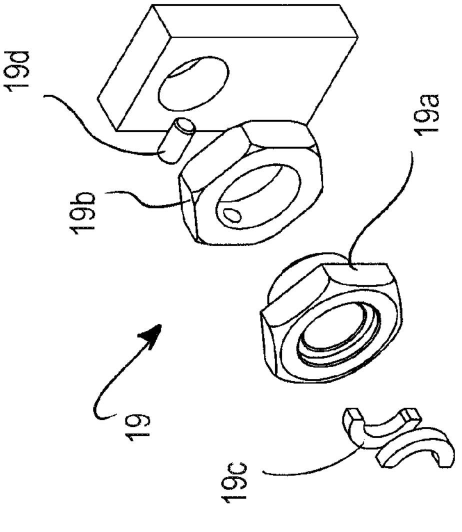

APPARATUS AND METHOD FOR THE DRY REMOVAL OF LABELS FROM CONTAINERS MADE OF PLASTICS

FIELD OF THE INVENTION

The invention relates to an apparatus and method for removing labels from containers made of plastics, in particular for removing tubular labels from PET bottles. Although in the following description reference is made to removing tubular labels from PET bottles, the present invention applies similarly to all those cases in which labels made of paper or plastics have to be partially and/or totally removed from any type of container made of plastics.

BACKGROUND OF THE INVENTION

It is known that for recycling containers for foodstuffs, and in particular PET bottles for beverages, the labels made of paper or of plastics first have to be removed, for example glued tubular labels made of heat-shrinkable plastics that are often associated with the aforesaid containers.

For example, from U.S. Pat. No. 4,209,344 and WO 9208591 plants are known in which paper labels in general are removed by a process of washing in a bath of hot water with great agitation with the addition of a suitable cleaning chemical; plants of this type, in addition to be extremely bulky, require large water consumption and thermal energy consumption.

On the other hand, particular problems exist for removing tubular labels made of plastics, for example PVC heat-shrinkable labels from containers and/or PET bottles, inasmuch as removal thereof is extremely difficult with conventional plants; in fact the containers could break if subjected to great stress, with the consequent loss of plastics having a high financial value.

As the use of PET containers with tubular labels made of plastics has become increasingly widespread over the years in the food industry and in view of the high value of PET material, collecting Post-consumer containers and/or bottles intended to be recycled has taken on significant economic importance.

During the collection of Post-consumer material, the PET bottles are normally compressed into bales and are greatly deformed together with solid bodies and other foreign matter, which has to be eliminated by a suitable pre-washing step; after pre-washing the bottles are ground and subjected to other treatments before being transformed into pellets for further use.

As the plastics of the labels are a major pollutant in the process of recycling PET various technologies have been developed for trying to eliminate all or most of the labels from the PET bottles before transformation into granules.

For example, in U.S. Pat. No. 4,379,525 a method has been proposed in which the containers with the labels are ground finely by stirring the ground granules in a bath of hot water to remove the label part that remained adhering thereto; subsequently, filtering and recirculating steps of the ground granules and of the process water occur until the material of the labels has been completely eliminated. A similar method, in addition to requiring an equally complex system, entails great energy expenditure and consequent high financial costs.

In DE 10308500 a method has been proposed for dry removal of the labels from the containers, before grinding, according to which the containers with the labels are passed through an apparatus comprising a stator with holes, having a polygonal section, inside which a rotor rotates that comprises a plurality of large cross-shaped tools, which are suitable for generating axial and tangential forces on the containers inside the stator.

Although the rotor is rotated at a relatively low number of revolutions, comprised between 500 and 2500 revolutions per minute, the proposed solution is difficult to adapt to removing labels from containers that during collection and storage have been greatly deformed, crushing the labels axially or sideways; further, with high tangential speeds of the tools of the rotor it is not excluded that part of the containers can be partially broken with the detachment of the necks of the bottles and consequent loss of plastics of high financial value.

In turn, WO 2011012113 proposes an apparatus for removing labels from PET containers or bottles, comprising a cylindrical stator, inside which a polygonal rotor rotates that is provided with a plurality of axially spaced tools; the tools are configured with a step profile and are angularly oriented for dragging in rotation the containers and for generating mechanical stress that is suitable for removing the labels and possible foreign bodies that have remained adhering to the containers. Also this solution is not without drawbacks because of the great mechanical stress and the forces of the impact generated by the tools during rotation of the rotor, with consequent breakage of the containers and loss of plastics. In particular, owing to the step profiles of the tools, between the stator and the rotor a gap is defined the thickness of which is not uniform, but varies from zone to zone according to the pattern of the profile of the various tools. In other words, the bottles advance in the gap, traversing narrower passage zones at the more protruding parts of the tools, and wider passage zones, at the less protruding parts of the tools. Such a configuration can generate a “wedging” and/or blocking effect for the bottles that often leads the latter to undergo significant mechanical stress until consequent breakage.

SUMMARY OF THE INVENTION

The general object of the invention is to provide a method and an apparatus for the dry removal of labels from containers made of plastics, in particular for the total and/or partial removal of tubular labels made of plastics from PET bottles, that is able to overcome the drawbacks of the systems that are commonly in use and are per se known.

In particular, an object of the present invention is to provide a different apparatus and a different method for the dry removal of labels from PET containers by means of which it is possible to remove partially or totally the labels from post-consumer containers, in the absence of great stress and harmful impact forces, preventing the containers from being broken thus entailing an undesired loss of material. In particular, an object of the invention is to provide an apparatus comprising a stator and a rotor that are suitably configured for advancing the containers or PET bottles and exerting on the surfaces thereof a mechanical action that is evenly distributed and such as to have as an effect, in substance, only the removal of the labels without subjecting the aforesaid objects to mechanical stress that can damage the latters during rotational dragging and axial advancement.

These objects and further advantages of the invention are achievable by an apparatus and by a method for the dry removal of labels from containers made of plastics according to the invention.

In particular, in a first aspect of the invention an apparatus is provided that is suitable for removing labels from containers made of plastics comprising:

a tubular stator and a rotor defining an annular chamber that extends axially between an inlet and an outlet for the containers;

on said rotor dragging and thrusting members being mounted for rotationally dragging and thrusting the containers inside said annular chamber, characterised in that:

on said tubular stator there are first scraping tools provided with first tip ends, and in that said dragging and thrusting members comprise second scraping tools provided with second tip ends that are distributed along one or more helical paths, said first tip ends and said second tip ends defining respectively in said annular chamber a first punctiform scraping surface and a second punctiform scraping surface for said containers, in which the distance between said first punctiform scraping surface and said second punctiform scraping surface keeps substantially constant in a longitudinal direction and in a circumferal direction with respect to said rotor.

Owing to this configuration, inside the aforesaid annular chamber a passage gap is generated for the containers, bounded by the first and second punctiform scraping surfaces, the passage gap having a passage section that is maintained constant between the inlet and the outlet of the apparatus, preventing the drawbacks of the prior art systems in which the containers can stick and become blocked in "wedge" zones with consequent breakages.

In one embodiment, the position of the scraping tools located on the rotor can be set radially to the rotor in a desired manner, by acting on a suitable adjustable fixing system so as to optimise the operation of the apparatus according to the type and geometry of the containers to be processed.

In a second aspect of the invention, a method is provided for dry removal of labels from containers made of plastics by the apparatus according to the first aspect of the invention, comprising the steps of:

dragging in rotation and advancing said containers along longitudinal paths inside said annular chamber by said dragging and thrusting members, removing, during advancement along said longitudinal paths, the labels from said containers by said first scraping tools and said second scraping tools, characterised in that said labels are removed by subjecting said containers to a scraping action generated by a first punctiform scraping surface defined by tip ends of said first scraping tools and from a second punctiform scraping surface defined by respective tip ends of said second scraping tools, in which the distance between said first punctiform scraping surface and said second punctiform scraping surface keeps substantially constant both longitudinally and circumferally to an advancement direction from said inlet to said outlet.

Further features and advantages will be clear from the following description with the help of the attached drawings that show by way of non-limiting example some embodiments of the apparatus according to the invention.

BRIEF DESCRIPTION OF THE DRAWINGS

FIGS. 10 to 12 show, in various views, a first embodiment of scraping tools;

FIG. 13 is a rear view of a scraping tool according to the first embodiment;

FIG. 14 is a section of the scraping tool taken along the plane XIV-XIV in FIG. 13;

DETAILED DESCRIPTION OF THE INVENTION

Figure 1:
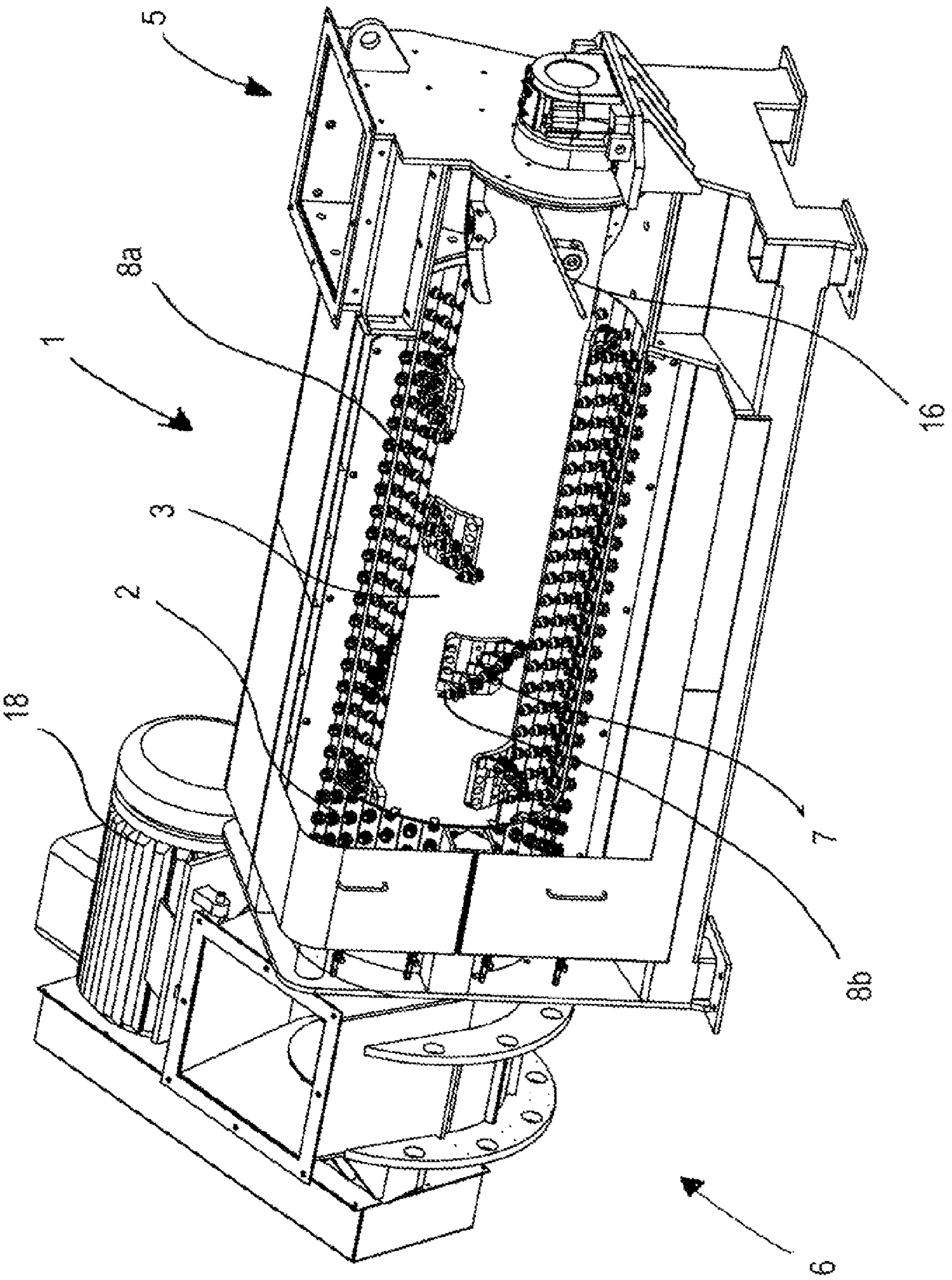
FIG. 1 is a perspective view of the apparatus, with part of the external casing removed.
Figure 2:
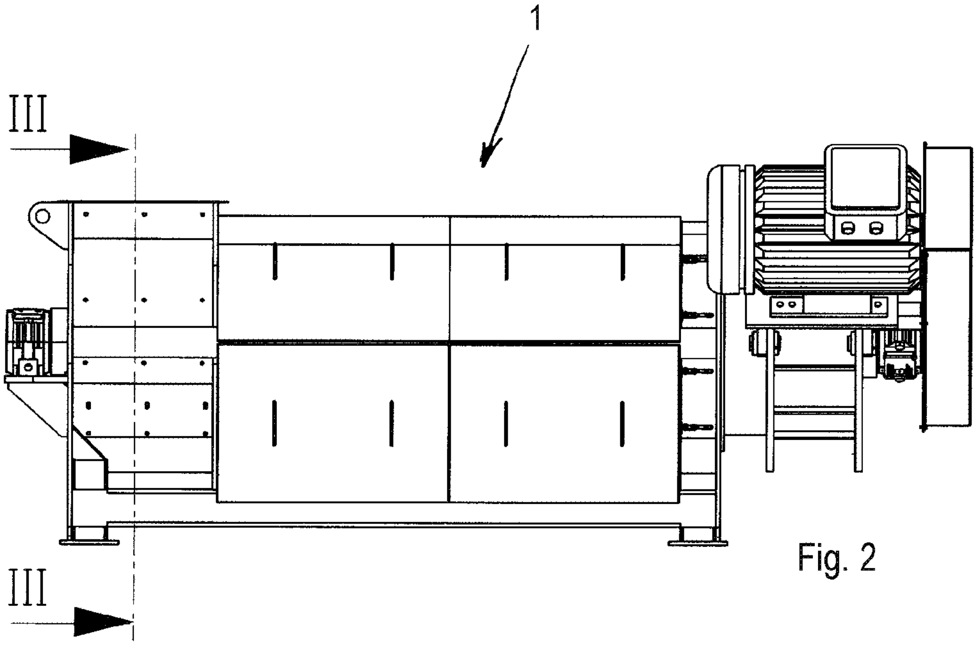
FIG. 2 is a side view of FIG. 1.
Figure 3:
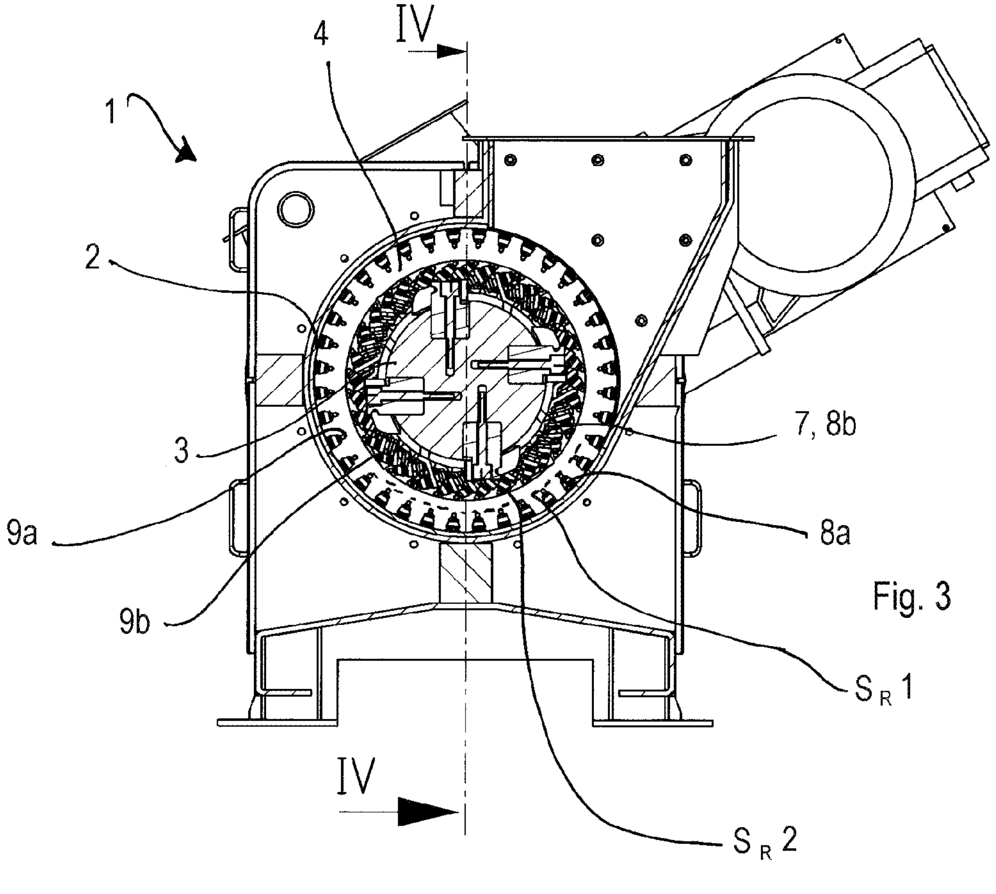
FIG. 3 is a cross section along plane III-III in FIG. 2.
Figure 4:
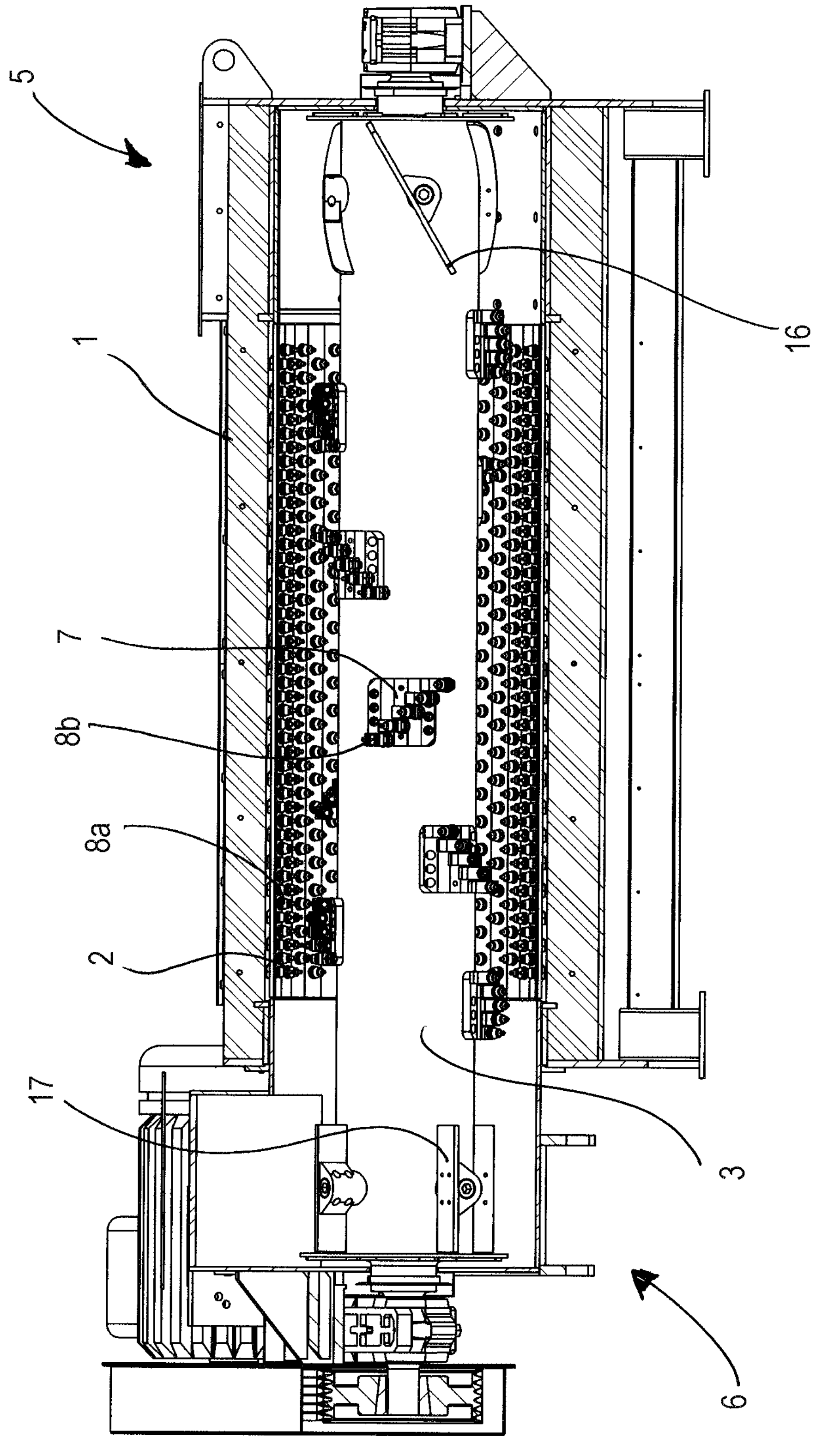
FIG. 4 is a partially sectioned longitudinal view of the apparatus.
Figure 5:
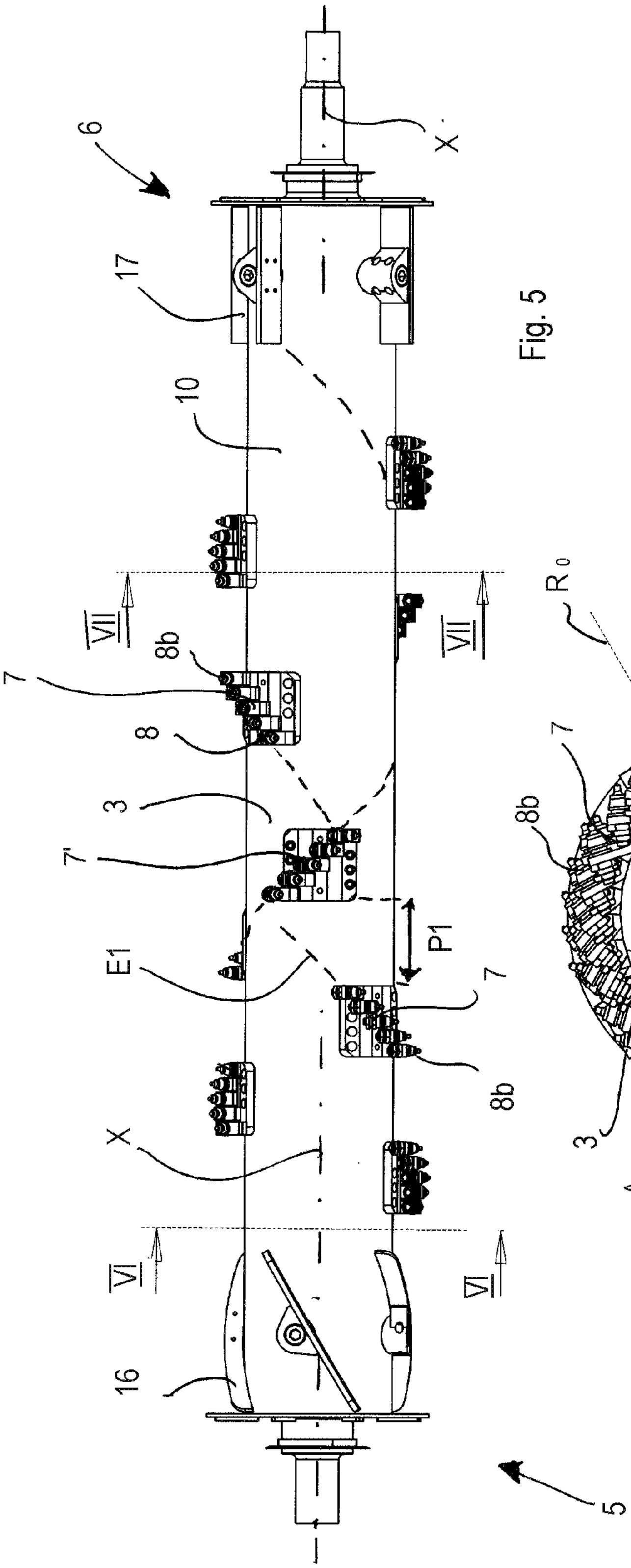
FIG. 5 is a side view of a rotor included in the apparatus.
Figure 6:
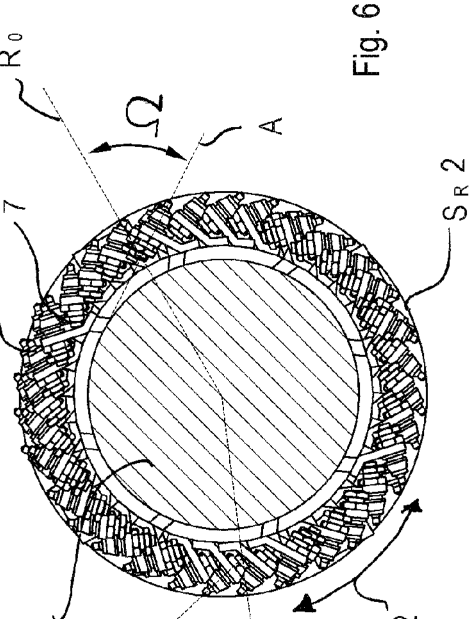
FIG. 6 is a cross section taken along the plane VI-VI in FIG. 5.
Figure 8:
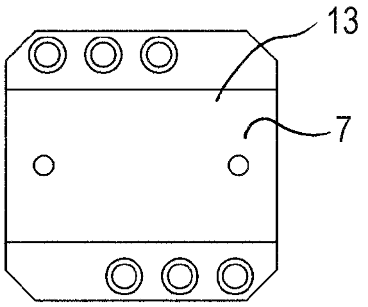
FIG. 8 shows a particular of a scraping unit of the rotor.

With reference to the attached figures, the general features of an apparatus 1 are disclosed below for the dry removal of labels from containers made of plastics according to the invention.

The apparatus 1 is suitable for the partial and/or total dry removal of labels from any type of containers made of plastics after consumption and in particular is suitably applied in the removal of tubular labels made of plastics from containers or bottles made of PET.

The apparatus 1 comprises an external case, having an inlet 5 for introducing the containers to be treated, and an outlet 6 for the treated containers and the labels, and/or parts of labels that have been removed.

The apparatus 1 comprises a tubular stator 2 that extends axially between the inlet 5 and the outlet 6, and a rotor 3 that has a longitudinal axis X and can extend beyond the stator 3, both towards the inlet 5 and the outlet 6.

Between the tubular stator 2 and the rotor 3 an annular chamber 4 is defined along which the containers advance.

The rotor 3 is supported by two end supporting units and is operationally connected to an electric control motor 18 that rotates at a number of revolutions per minute that is suitable for rotationally dragging and advancing the containers along helical paths, as detailed below, between the inlet 5 and the outlet 6, maintaining a peripheral speed of the rotor 3 suitable for causing a breakage and a partial and/or total removal of the labels, while the containers are rotated and slide in contact with scraping tools 8*a*, 8*b*, disclosed below, without the containers being damaged. For example, the electric control motor 18 can be configured for rotating the rotor 3 at an angular speed comprised between 500 and 1100 rpm.

On the rotor 3 there are first blades 16, at the inlet 5, and second blades 17 at the outlet 6, that are fixed removably and angularly orientably to the rotor 3. In particular, the first blades 16 are tilted with respect to the longitudinal axis X of the rotor 3, so as to give a thrust to the containers in the advance direction. The second blades 17 are oriented parallel to the longitudinal axis X as they have to perform the function of evacuating the containers to the outlet 6, giving the containers a direct evacuation thrust that is directed orthogonally to the aforesaid longitudinal axis X.

The rotor 3 comprises a cylindrical body having an external cylindrical surface 10 on which dragging and thrusting members 7 are mounted that are configured for rotationally dragging and pushing the containers, inside the annular chamber 4, from the inlet 5 to the outlet 6.

On the tubular stator 2 there are first scraping tools 8*a* provided with first tip ends 9*a*, whereas the aforesaid dragging and thrusting members 7 comprise second scraping tools 8*b* provided with second tip ends 9*b* that are distributed along one or more helical paths E1.

The first tip ends 9*a* and the second tip ends 9*b* define in the annular chamber 4 respectively a first punctiform scraping surface SR1 and a second punctiform scraping surface SR2 for the containers.

The distance between the first punctiform scraping surface SR1 and the second punctiform scraping surface SR2 keeps substantially constant in a longitudinal and circumferal direction with respect to the rotor 3.

Owing to the particular arrangement and configuration of the scraping tools 8, and to the particular distribution of the respective tip ends 9, inside the annular chamber 4 a passage gap is defined for the containers, delimited by the first SR1 and second SR2 scraping punctiform surfaces, the passage gap having a passage section that is maintained constant along the annular chamber 4. This configuration, advantageously, prevents the drawbacks that are inherent in the prior-art systems in which the containers can become lodged and blocked in zones with a variable section that generate a "wedge" effect with consequent breakages of the containers.

In one embodiment, which will be disclosed in detail below, the position of the scraping tools 8 placed on the rotor can be set radially with respect to the rotor, in a desired manner by acting on a suitable adjustable fixing system so as to optimise the operation of the apparatus according to the type and geometry of the containers to be processed.

By way of pure example, the annular gap between the rotor 3 and stator can have a thickness that may range between 30 mm and 60 mm.

Each of the first scraping tools 8*a* and of the second scraping tools 8*b* comprises a frustoconical base 23A, a pin-shaped part 23B that protrudes partially into the annular chamber 4, and a shank portion 23C configured for permitting removable fitting on the stator 2 and/or on the rotor 3.

The scraping tools are made of material with high mechanical resistance and hardness with a part that can be made of cast iron or steel, and the tip ends 9 for example of tungsten steel or a carbide steel.

The dragging and thrusting members that are fitted on the rotor 3 comprise several scraping units 7, each of which consists of a certain number of second scraping tools 8*b* that are fitted on the same plate-shaped supporting base 13. In the examples shown each scraping unit 7 comprises five scraping tools 8*b* arranged substantially according to a diagonal on the respective supporting base 13. Nevertheless, the number and arrangement of the second scraping tools 8*b* is not limiting and can be selected on the basis of particular process needs.

The scraping units 7 are spaced apart from one another by a certain axial pitch P1 in a longitudinal direction to the rotor 3 and by a certain angular pitch P2 in a direction that is circumferal to said rotor 3. The aforesaid steps P1 and P2 are chosen appropriately according to certain required process requisites. For example, the axial step P1 can be comprised, in a non-limiting manner, between 50 mm and 100 mm, for example it can be equal to about 70 mm for a rotor that can have a length that is about equal to a total of 3 m and a diameter comprised between 400 mm and 800 mm, for example 600 mm. The number and the mutual distance and position of the scraping units 7 are chosen appositely to permit a regular flow of containers.

The angular pitch P2 can be in one case equal to 60'; nevertheless, the angular pitch P2 can be greater or less than the aforesaid value, according to the diameter of the rotor 3 and specific use needs.

The scraping units 7 are distributed and staggered along several helical paths E1; in other words, the scraping units of a helical path are axially staggered with respect to the scraping units of a further helical path that is wound on the rotor 3.

Figure 9:
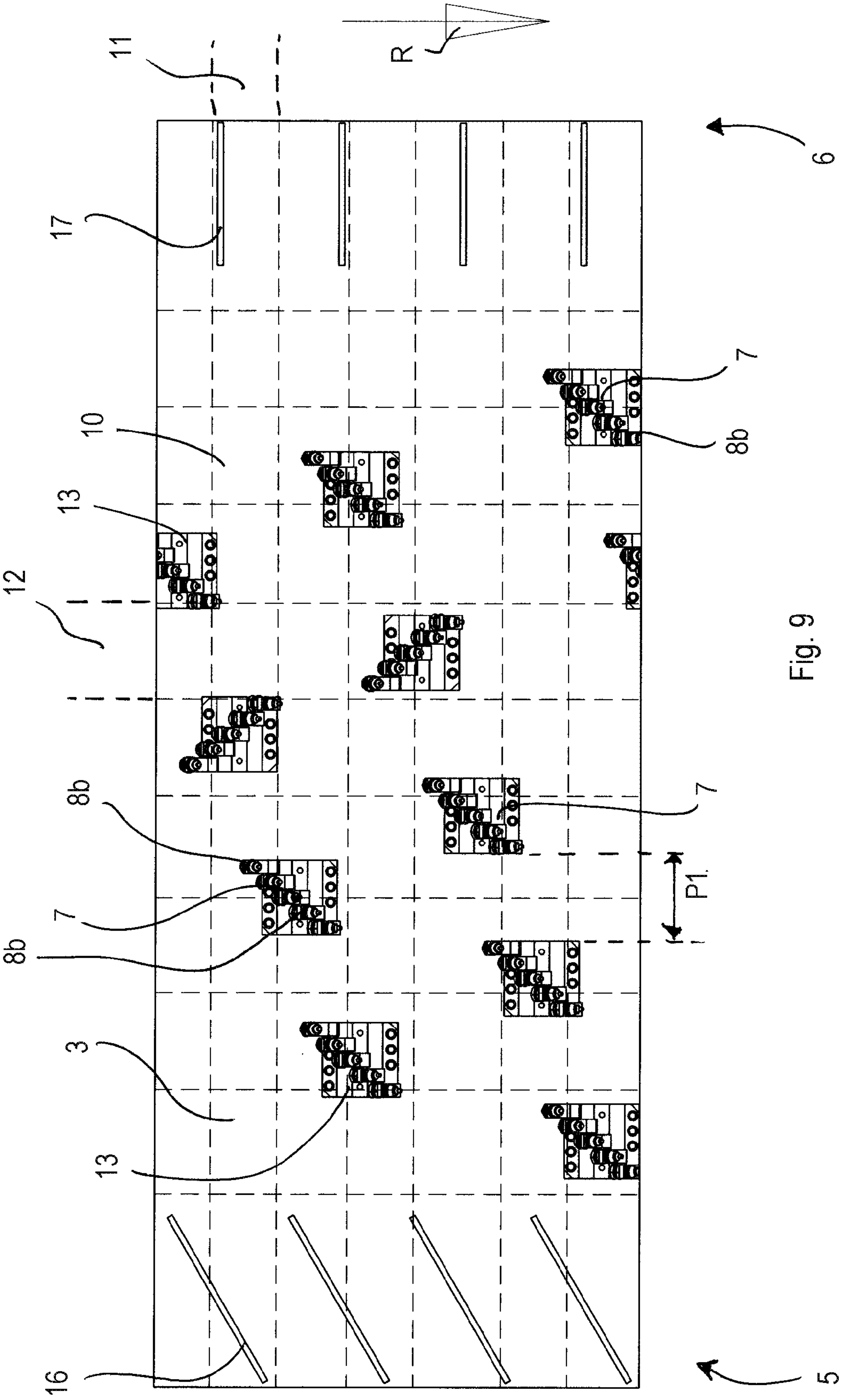
FIG. 9 shows schematically a plane development of the rotor on which several dragging and thrusting members are distributed, including scraping tools.
Figure 18:
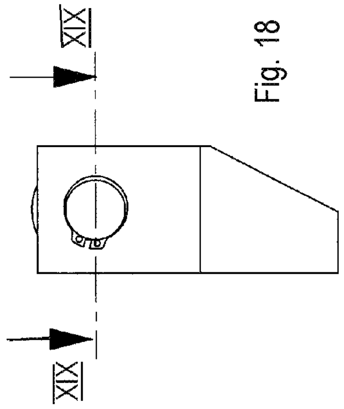
FIG. 18 is a rear view of the second embodiment of scraping tool.
Figure 19:
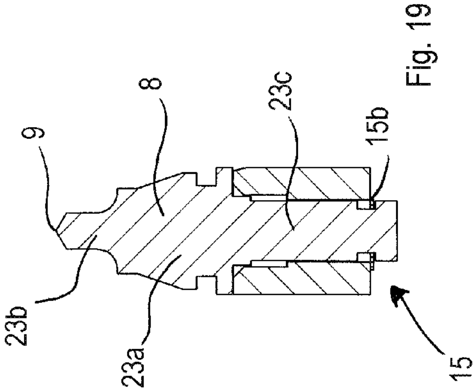
FIG. 19 is a section of the scraping tool taken along the plane XIX-XIX in FIG. 18.
Figure 16:
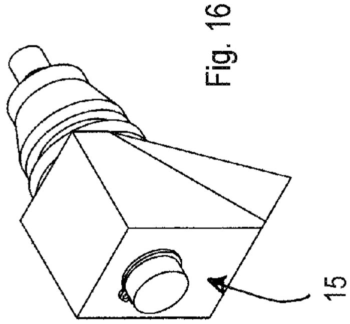
FIGS. 15 to 17 show, in various views, a second embodiment of scraping tools.
Figure 17:
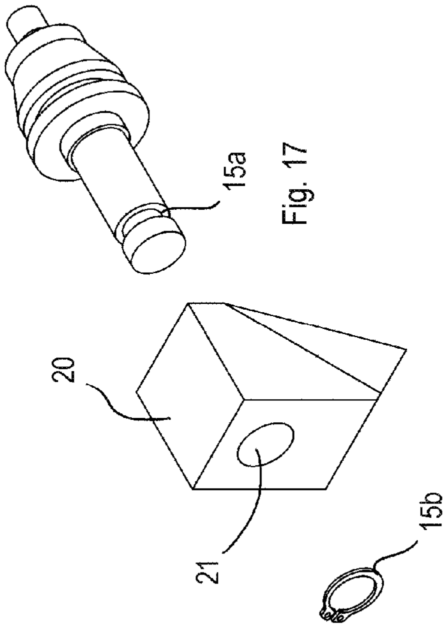
Figure 15:
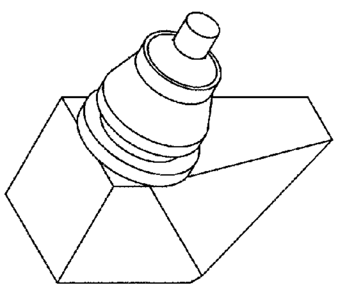

FIG. 9 highlights schematically the arrangement of the scraping units 7 on the surface 10 of the rotor 3 that is shown in a flat extension.

If the surface 10 of the rotor 3 is subdivided into longitudinal strips 11 and into circumferal strips 12, which are plotted in FIG. 9 on the flat extent of the surface 10, it is noted how the scraping units 7 are distributed and mutually staggered such that on each longitudinal strip 11 and on each circumferal strip 12 there is at least part of one or more scraping units 7. This enables a well-distributed arrangement of the scraping tools 8*b* on the rotor 3 to be obtained, that, in synergy with the distribution of the scraping tools 8*a* on the stator 2 implies a more effective scraping action of the containers.

The first scraping tools 8*a*, placed on the stator 2, are oriented substantially in a radial direction to the rotor 3.

Each of the second scraping tools 8*b* that are mounted on the rotor 3 extends along a plane that is orthogonal to the longitudinal axis X of the rotor 3, and extends with a respective axis A that is tilted by an angle Ω with respect to a straight line Ro that is orthogonally incident to the longitudinal axis X. Each of the second scraping tools 8*b* is oriented so as to point in the rotation direction R of the rotor 3.

This particular orientation of the second scraping tools 8*b* enables the scraping action thereof on the containers to be directed correctly and effectively, taking account of the rotation direction and of the tangential speed with which the second scraping tools 8*b* move.

Each of the supporting bases 13 of the respective scraping units 7 is received removably in a respective housing seat 14 obtained on the rotor 3.

In particular, each supporting base 13 is coupled with the rotor 3 by means of an adjustable fixing system SF that enables the position to be varied in a radial direction DR of the supporting base 13 with respect to the rotor 3. It is thus possible to choose a desired degree of protrusion of the second scraping tools 8*b* in the annular chamber 4 so as to be able to set a desired distance between the first punctiform scraping surface SR1 and the second punctiform scraping surface SR2.

Figure 7:
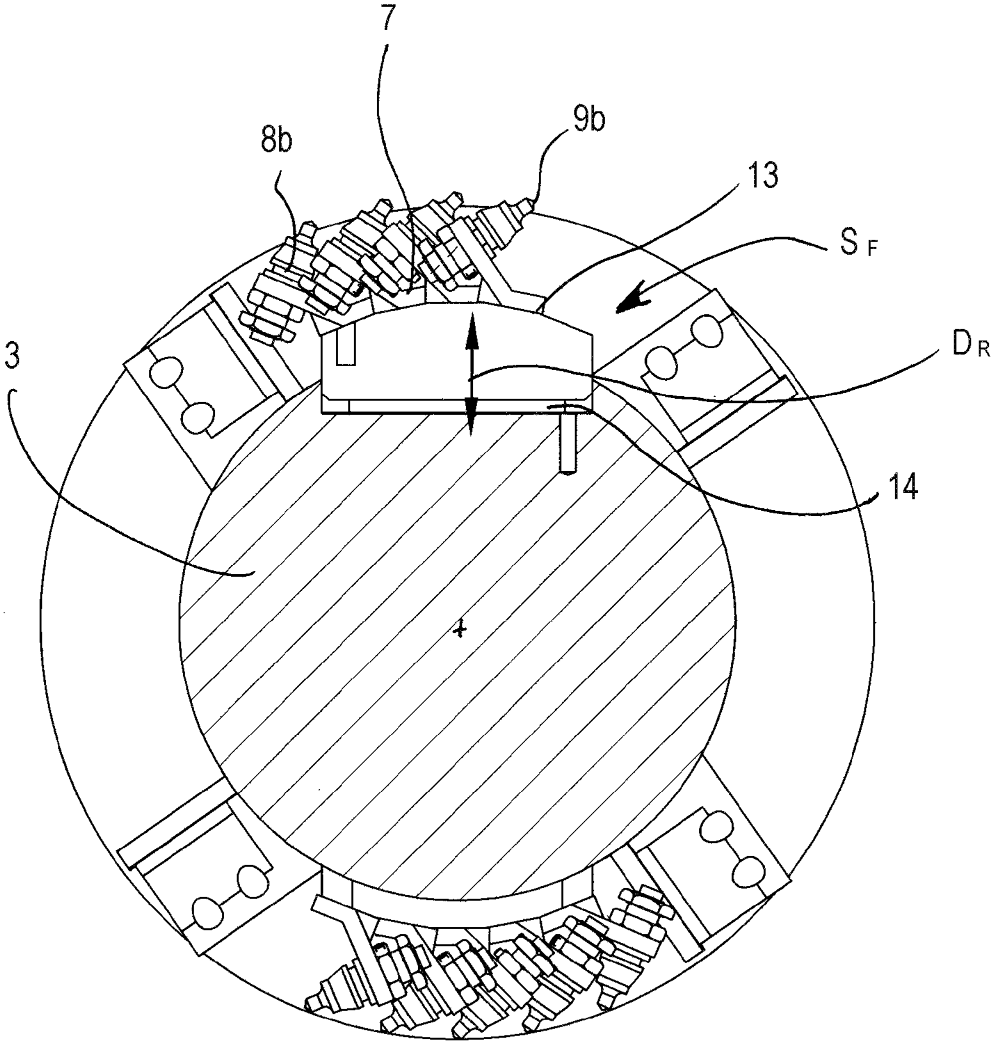
FIG. 7 is a cross section taken along the plane VII-VII in FIG. 5.

As illustrated better in FIG. 7, between the base 13 and the housing seat 14 a gap is defined that can house spacing elements with a suitable thickness so as to determine the desired protrusion of the scraping unit 7 with respect to the surface 10 of the rotor 3.

In a first embodiment, with reference to FIGS. 10 to 14, the scraping tools 8 are fitted in a fixed position on the stator 2 and/or on the rotor 3 by suitable fixing means 19 that comprises annular elements 19*a*, ring nut elements 19*b*, locking rings 19*c* and safety screws 19*d* that engage holes 19*e* obtained on the ring nut elements 19*b*.

In a second embodiment, the first scraping tools 8*a* and/or the second scraping tools 8*b* are mounted respectively on the stator 2 and on the rotor 3 by a rotatable coupling 15, defined by a supporting portion 20 having an opening 21 for receiving the shank of the tool, from suitable annular seats 15*a* cooperating with engaging elements, such as Seeger rings 15*b*. This configuration enables the scraping tools to rotate freely around the respective axes bringing the benefit of more effective operation of the tools and slower wear that progresses in a manner distributed uniformly over the entire surface of the tip of each scraping tool. 8.

Figure 23:
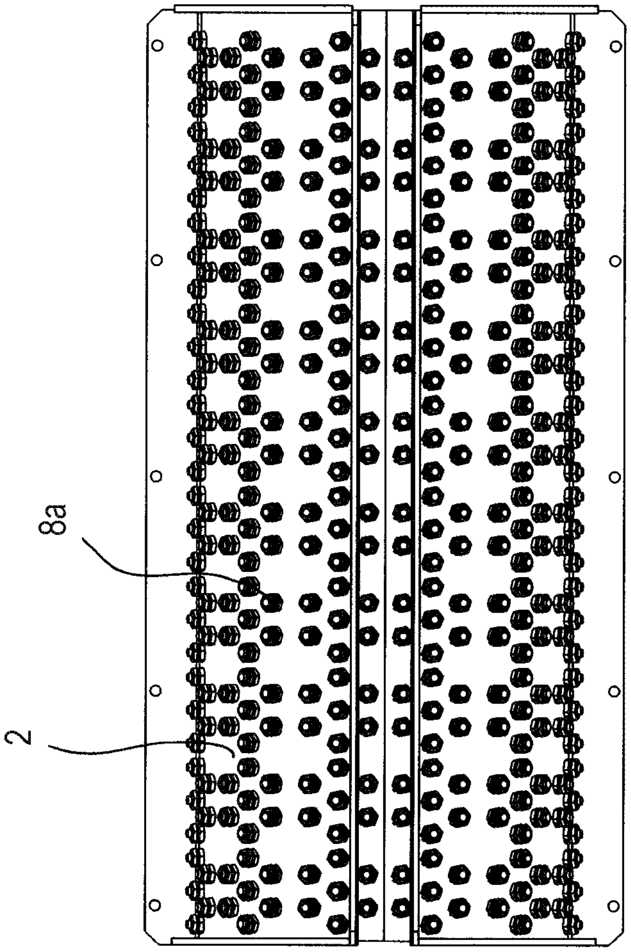
FIG. 23 is a side view of the stator of FIG. 22.
Figure 22:
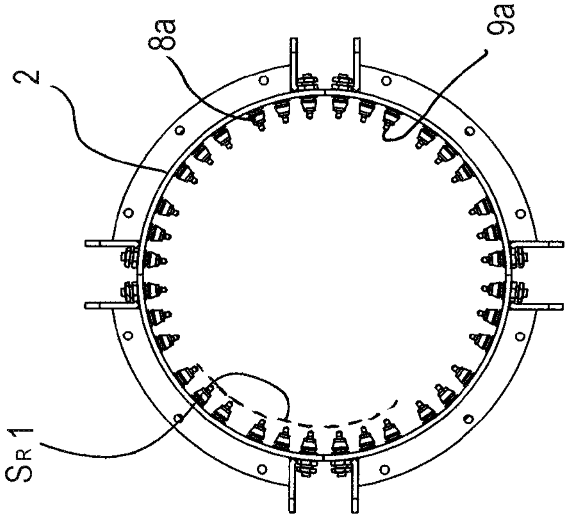
FIG. 22 is a front view of a second embodiment of the stator.

The stator 2, in particular, is made of several mutually couplable and fixable pieces. In the embodiments shown and disclosed by way of example, the stator 2 is defined by four sectors that are connected firmly to one another by suitable fixing means. The stator 2, in one embodiment, has a circular shape, as shown in FIGS. 22 and 23.

Figure 20:
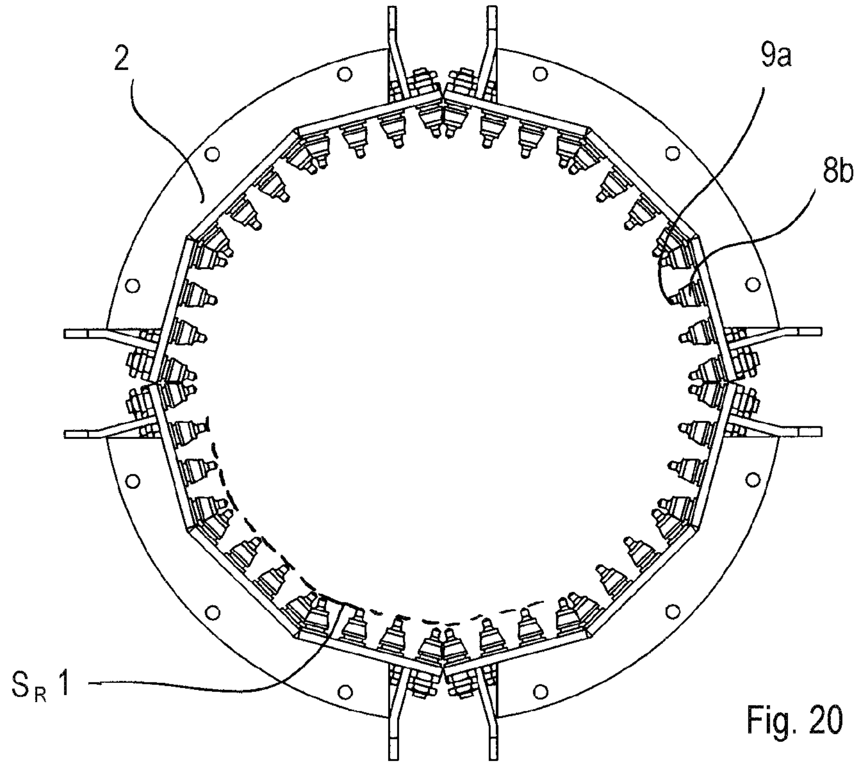
FIG. 20 is a front view of a first embodiment of the stator.
Figure 21:
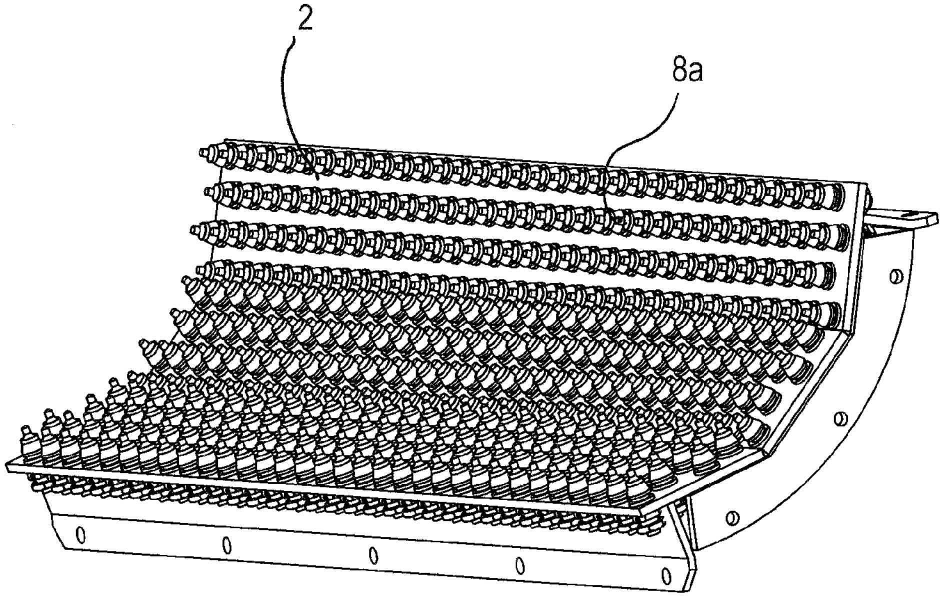
FIG. 21 is a perspective view of a portion of the stator of FIG. 20.

In a preferred embodiment, shown in FIGS. 20 and 21, the stator 2 has a polygon-shaped section. This shape advantageously means that the containers, during rotational dragging, undergo more accentuated impact actions, and thus a braking action, which entail a more marked and intense interaction and sliding of the containers against the scraping tools 8.

The first scraping tools 8*a* placed on the stator 2 are aligned along a plurality of parallel rows that are spaced angularly apart from one another, and/or along helical rows.

In one embodiment of the apparatus 1, some of the scraping units 7, which can be defined as counterthrust scraping units 7', are configured for exerting on the containers a counterthrust that contrasts the normal advancement thereof in an axial direction to the outlet 6. In particular, the respective second tools 8*b* of such counterthrust scraping units 7' are distributed according to one or more helical portions that are wound in an opposite direction to the helical paths E1 of the other second scraping tools 8 that on the other hand contribute to the advancement of the containers in an axial direction. In this manner, the counterthrust scraping units 7' exert on the containers a counterthrust that tends to slow the advancement speed thereof in an axial direction. This prevents the containers from leaving the annular chamber 4 too hurriedly, prematurely, ensuring on the other hand their remaining in the annular chamber 4 for a sufficient time to receive a suitable scraping action of the tools to remove all the labels.

The scraping tools 8*a* and 8*b*, unlike other equipments of known type, operate simply with a certain friction to break and scrape the labels from the containers, without generating harmful blow stress or damaging the containers. In the present description, reference is made to scraping tools 8*a* and 8*b* having a frustoconical part 23A and a further pin-shaped part 23B that protrudes partially into the annular chamber 4. This geometrical conformation at the same time enables a suitable distance between the ends of the scraping tools 8 and a narrow space between the base portions of the scraping tools 8 to be maintained, so as to avoid of jamming of the containers.

Nevertheless, further geometrical configurations of the scraping tools can be envisaged on condition that they are provided with tip ends for exerting the scraping and tearing action on the labels. For example, the scraping tools can consist of simple cylindrical pins ending in a pointed or slightly rounded end; such scraping tools can protrude inside the stator 2 by a portion that is for example equal to a little more or less than half the radial height of the annular chamber 4; further, the distance, or pitch, between scraping tools 8 must be chosen so as to provide a great number of points of tearing and scraping of the labels, at the same time preventing the bottles or containers, in the deformed state, becoming jammed or blocked in the spaces between contiguous tools.

During operation, the containers, delivered into the apparatus 1 through the inlet 5, are dragged rotationally and advanced axially by the dragging and thrusting members which include the scraping units 7, along longitudinal paths inside the annular chamber 4. During the advancement, the labels are scraped by the first scraping tools 8*a* and by the second scraping tools 8*b* so as to be removed from the respective containers. Owing to the configuration of the scraping tools, the containers are subjected to a scraping action generated by the first punctiform scraping surface SR1, defined by the tip ends of the first scraping tools 8*a*, and by the second punctiform scraping surface SR2 defined by the tip ends of the second scraping tools 8*b*. Owing to the fact that the distance between the first SR1 and the second SR2 scraping punctiform surface is maintained substantially constant both longitudinally and circumferally, an effective scraping action is achieved for removing the labels that is conducted without the risk that the containers become jammed or wedge in zones with a variable section.

During the removal process, the removed labels or removed label parts are expelled by a flow of air generated by the rotation of the rotor 3.

From what has been said and shown in the attached drawings, it is clear that a method and an apparatus have been provided that enable the dry removal of labels from containers made of plastics possible, in particular tubular labels from containers or PET bottles, in the absence of great stress and of harmful impact forces, preventing the containers suffering breakages with consequent undesired losses of material. In particular, owing to the invention, an apparatus has been provided with a stator and rotor that is able to exert on the surfaces of the containers a mechanical action that is evenly distributed and such as to have as an effect, substantially, only the removal of the labels without subjecting the aforesaid bottles or containers to mechanical stress that may damage them during rotational dragging and axial advancement.

It is further understood that what has been said and shown in the attached drawings has been stated merely by way of example of the method and of the general features, and of some preferential embodiments of the apparatus according to the present invention. Thus other modifications or variations can be made to the entire apparatus, or parts thereof, and to the respective operating method, without thereby falling outside the scope of the claims.

The invention claimed is:

1. An apparatus that is suitable for removing labels from containers made of plastics comprising:

a tubular stator and a rotor defining an annular chamber that extends axially between an inlet and an outlet for the containers;

on said rotor there being mounted dragging and thrusting members for rotationally dragging and thrusting the containers inside said annular chamber;

wherein on said tubular stator there are first scraping tools provided with first tip ends, and in that said dragging and thrusting members include second scraping tools provided with second tip ends that are distributed along one or more helical paths, said first tip ends and said second tip ends defining respectively in said annular chamber a first punctiform scraping surface and a second punctiform scraping surface for said containers, in which a distance between said first punctiform scraping surface and said second punctiform scraping surface keeps substantially constant in a longitudinal direction and in a circumferential direction with respect to said rotor;

wherein the first scraping tools are oriented substantially in a radial direction towards the rotor and each of the second scraping tools extends along a plane that is orthogonal to a longitudinal axis of said rotor, each of said second tools having a respective axis that is tilted by an angle with respect to a straight line that is orthogonal to said longitudinal axis and points in a rotation direction of said rotor; and wherein the first punctiform scraping surface is a discontinuous scraping surface defined by the first tip ends of the first scraping tools, and the second punctiform scraping surface is a discontinuous scraping surface defined by the second tip ends of the second scraping tools.

2. The apparatus according to claim 1, wherein each of said first scraping tools and of said second scraping tools comprises a frustoconical base, a pin-shaped part that extends partially into said annular chamber, and a shank portion configured for enabling removable fitting onto said stator and onto said rotor.

3. The apparatus according to claim 1, wherein said dragging and thrusting members comprise scraping units, defined by a certain number of second scraping tools, said scraping units being spaced apart from one another by a certain axial pitch in a longitudinal direction along said rotor, and by a certain angular pitch in a direction that is circumferential to said rotor.

4. The apparatus according to claim 3, wherein said scraping units are distributed and staggered along several helical paths, the scraping units of a helical path being axially staggered with respect to the scraping units of a further helical path.

5. The apparatus according to claim 3, wherein said rotor comprises a cylindrical surface dividable into a plurality of longitudinal strips and of circumferential strips, and wherein said scraping units are distributed and staggered on said cylindrical surface such that on each longitudinal strip and on each circumferential strip there is at least part of one or more scraping units.

6. The apparatus according to claim 1, wherein said second scraping tools are mounted in a distributed manner on several supporting bases, each supporting base having a plate-shaped conformation and being received in a removable manner in a respective housing seat obtained on said rotor.

7. The apparatus according to claim 6, wherein each supporting base is coupled with said rotor by means of an adjustable fixing system that enables a position to be varied in a radial direction of said supporting base and thus a degree of protrusion of said second scraping tools in said annular chamber to be varied so as to be able to set a desired distance between the first punctiform scraping surface and said second punctiform scraping surface.

8. The apparatus according to claim 1, wherein said first scraping tools and/or said second scraping tools are fitted respectively on said stator and on said rotor by a rotatable coupling that enables free rotation thereof around the respective axes, to improve operational efficacy and obtain slower wear that is uniformly distributed over the entire surface of the tip of each scraping tool.

9. The apparatus according to claim 1, wherein on each of said scraping units, the respective second tools are distributed according to one or more helical portions that are wound in an opposite direction to the helical paths of the other second scraping tools, so as to exert on said containers a counterthrust that tends to slow an advancement speed thereof in an axial direction.

10. The apparatus according to claim 1, wherein on said rotor there are first blades, near said inlet and second blades near said outlet that are fixed removably and angularly oriented relative to said rotor.

11. The apparatus according to claim 10, wherein said first blades are tilted with respect to the longitudinal axis of said rotor, and said second blades are oriented parallel to said longitudinal axis.

12. The apparatus according to claim 1, wherein said first scraping tools of the stator, are aligned along a plurality of parallel rows that are spaced angularly apart from one another, and/or along helical rows.

13. The apparatus according to claim 1, wherein said first scraping tools of the stator are aligned along a plurality of parallel rows that are spaced angularly apart from one another, and/or along helical rows.

14. A method for dry removal of labels from containers made of plastics according to comprising the steps of:

dragging in rotation and advancing said containers along a longitudinal path:

removing, during advancement along the longitudinal path, the labels from said containers by first scraping tools on a tubular stator and second scraping tools on a rotor:

wherein the labels are removed by subjecting the containers to a scraping action generated by a first punctiform scraping surface defined by tip ends of said first scraping tools and by a second punctiform scraping surface defined by respective tip ends of said second scraping tools, in which a distance between said first punctiform scraping surface and said second punctiform scraping surface is maintained substantially constant both longitudinally and circumferentially to the path;

wherein said first scraping tools are oriented substantially in a radial direction towards said rotor and each of said second scraping tools extends along a plane that is orthogonal to a longitudinal axis of said rotor, each of said second tools having a respective axis that is tilted by an angle with respect to a straight line that is orthogonal to said longitudinal axis and points in a rotation direction of said rotor; and wherein the first punctiform scraping surface is a discontinuous scraping surface defined by the first tip ends of the first scraping tools, and the second punctiform scraping surface is a discontinuous scraping surface defined by the second tip ends of the second scraping tools.

15. The method for the dry removal of labels from containers made of plastics according to claim 14, wherein the removed labels or removed label parts are expelled by a flow of air generated by rotation of said rotor.

16. The method for the dry removal of labels from containers made of plastics according to claim 14, wherein tubular labels made of plastics are removed from PET containers.

17. The method for the dry removal of labels from containers made of plastics according to claim 15, wherein tubular labels made of plastics are removed from PET containers.

* * * * *